US008784533B2

(12) United States Patent
Leta et al.

(10) Patent No.: US 8,784,533 B2
(45) Date of Patent: *Jul. 22, 2014

(54) TEMPERATURE SWING ADSORPTION PROCESS FOR THE SEPARATION OF TARGET SPECIES FROM A GAS MIXTURE

(75) Inventors: Daniel P. Leta, Flemington, NJ (US); Preeti Kamakoti, Summit, NJ (US); Harry W. Deckman, Clinton, NJ (US); Peter I. Ravikovitch, Princeton, NJ (US); Thomas N. Anderson, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/406,079

(22) Filed: Feb. 27, 2012

(65) Prior Publication Data

US 2012/0312163 A1 Dec. 13, 2012

Related U.S. Application Data

(60) Provisional application No. 61/447,848, filed on Mar. 1, 2011, provisional application No. 61/447,806, filed on Mar. 1, 2011, provisional application No. 61/447,812, filed on Mar. 1, 2011, provisional application No. 61/447,824, filed on Mar. 1, 2011, provisional application No. 61/447,869, filed on Mar. 1, 2011, provisional application No. 61/447,835, filed on Mar. 1, 2011, provisional application No. 61/447,877, filed on Mar. 1, 2011.

(51) Int. Cl.
*B01D 53/04* (2006.01)
*B01D 53/047* (2006.01)

(52) U.S. Cl.
USPC .......... 95/97; 95/99; 95/100; 95/115; 95/136; 95/139

(58) Field of Classification Search
USPC ............ 95/96–100, 103–106, 115, 143, 900, 95/902, 136, 139; 502/400, 60; 585/820, 585/823, 826; 423/230
See application file for complete search history.

(56) References Cited

U.S. PATENT DOCUMENTS

| | | | |
|---|---|---|---|
| 2,989,383 A | 6/1961 | Miller | |
| 3,594,983 A | 7/1971 | Yearout | |
| 4,094,652 A | 6/1978 | Lowther | |
| 4,269,611 A | 5/1981 | Anderberg | |
| 4,312,641 A | 1/1982 | Verrando et al. | |
| 4,329,158 A | 5/1982 | Sircar | |
| 4,350,501 A | 9/1982 | Bannon | |
| 4,405,343 A * | 9/1983 | Othmer | 95/105 |
| 4,424,837 A | 1/1984 | Farrell | |
| 4,433,707 A | 2/1984 | Farnham | |
| 4,640,694 A | 2/1987 | Leitgeb et al. | |
| 4,702,903 A | 10/1987 | Keefer | |
| 4,729,982 A | 3/1988 | Thistlethwaite et al. | |
| 4,753,919 A | 6/1988 | Whittenberger | |
| 4,772,579 A | 9/1988 | Thistlethwaite et al. | |
| 4,801,308 A | 1/1989 | Keefer | |
| 4,914,218 A | 4/1990 | Kumar et al. | |
| 4,968,329 A | 11/1990 | Keefer | |
| 5,057,296 A | 10/1991 | Beck | |
| 5,074,892 A | 12/1991 | Leavitt | |
| 5,082,473 A | 1/1992 | Keefer | |
| 5,089,034 A | 2/1992 | Markovs et al. | |
| 5,098,684 A | 3/1992 | Kresge et al. | |
| 5,102,643 A | 4/1992 | Kresge et al. | |
| 5,108,725 A | 4/1992 | Beck et al. | |
| 5,141,725 A | 8/1992 | Ramprasad et al. | |
| 5,171,333 A | 12/1992 | Maurer | |
| 5,225,174 A | 7/1993 | Friesen et al. | |
| 5,256,172 A | 10/1993 | Keefer | |
| 5,271,762 A | 12/1993 | Schoofs et al. | |
| 5,298,054 A * | 3/1994 | Malik | 95/99 |
| 5,516,745 A | 5/1996 | Friesen et al. | |
| 5,626,033 A | 5/1997 | Tamhankar et al. | |
| 5,669,962 A * | 9/1997 | Dunne | 95/115 |
| 5,792,897 A | 8/1998 | Rosser, Jr. et al. | |

(Continued)

FOREIGN PATENT DOCUMENTS

| | | |
|---|---|---|
| CN | 101475430 A | 7/2009 |
| EP | 1 421 986 B1 | 5/2004 |

(Continued)

OTHER PUBLICATIONS

Ruthven, D. M., Thaeron, C. "Performance of a parallel passage adsorbent contactor", Separation and Purification Technology, vol. 12 (1997), pp. 43-60.

(Continued)

*Primary Examiner* — Frank Lawrence
(74) *Attorney, Agent, or Firm* — David M. Weisberg; Bruce M. Bordelon

(57) ABSTRACT

A temperature swing adsorption process for the removal of a target species, such as an acid gas, from a gas mixture, such as a natural gas stream. Herein, a novel multi-step temperature swing/pressure swing adsorption is utilized to operate while maintaining very high purity levels of contaminant removal from a product stream. The present process is particularly effective and beneficial in removing contaminants such as $CO_2$ and/or $H_2S$ from a natural gas at relatively high adsorption pressures (e.g., at least 500 psig) to create product streams of very high purity (i.e., very low contaminant levels).

23 Claims, No Drawings

(56) References Cited

U.S. PATENT DOCUMENTS

| | | |
|---|---|---|
| 5,846,295 A | 12/1998 | Kalbassi et al. |
| 5,958,368 A | 9/1999 | Ryoo et al. |
| 6,051,050 A | 4/2000 | Keefer et al. |
| 6,063,161 A | 5/2000 | Keefer et al. |
| 6,077,457 A | 6/2000 | Friesen et al. |
| 6,080,226 A | 6/2000 | Dolan et al. |
| 6,136,222 A | 10/2000 | Friesen et al. |
| 6,197,092 B1 | 3/2001 | Butwell et al. |
| 6,293,998 B1 | 9/2001 | Dolan et al. |
| 6,315,817 B1 | 11/2001 | Butwell et al. |
| 6,336,957 B1 | 1/2002 | Tsymerman |
| 6,406,523 B1 | 6/2002 | Connor et al. |
| 6,475,265 B1 | 11/2002 | Baksh et al. |
| 6,514,318 B2 | 2/2003 | Keefer |
| 6,607,584 B2 | 8/2003 | Moreau et al. |
| 6,629,525 B2 | 10/2003 | Hill et al. |
| 6,651,658 B1 | 11/2003 | Hill et al. |
| 6,652,627 B1 | 11/2003 | Tonkovich et al. |
| 6,691,702 B2 | 2/2004 | Appel et al. |
| 6,905,592 B2 | 6/2005 | Bence et al. |
| 7,049,259 B1 | 5/2006 | Deckman et al. |
| 7,231,784 B2 | 6/2007 | Howard et al. |
| 7,270,792 B2 | 9/2007 | Deckman et al. |
| 7,491,250 B2 | 2/2009 | Hershkowitz et al. |
| 7,507,274 B2 | 3/2009 | Tonkovich et al. |
| 7,524,358 B2 | 4/2009 | Saxena et al. |
| 7,527,670 B2 | 5/2009 | Ackley et al. |
| 7,799,730 B2 | 9/2010 | Ringer et al. |
| 7,803,215 B2 | 9/2010 | Russell et al. |
| 7,938,886 B2 | 5/2011 | Hershkowitz et al. |
| 7,959,720 B2 | 6/2011 | Deckman et al. |
| 2003/0015093 A1 | 1/2003 | Wegeng et al. |
| 2003/0116016 A1 | 6/2003 | Monzyk et al. |
| 2005/0045030 A1 | 3/2005 | Tonkovich et al. |
| 2006/0075777 A1 | 4/2006 | Howard et al. |
| 2006/0102519 A1 | 5/2006 | Tonkovich et al. |
| 2006/0162556 A1 | 7/2006 | Ackley et al. |
| 2006/0165574 A1 | 7/2006 | Sayari |
| 2006/0210454 A1 | 9/2006 | Saxena et al. |
| 2006/0249020 A1 | 11/2006 | Tonkovich et al. |
| 2007/0085227 A1 | 4/2007 | Tonkovich et al. |
| 2007/0240449 A1 | 10/2007 | Howard et al. |
| 2007/0246106 A1 | 10/2007 | Tonkovich et al. |
| 2008/0028286 A1 | 1/2008 | Chick |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0314245 A1 | 12/2008 | Hershkowitz et al. |
| 2009/0151562 A1 | 6/2009 | Russell et al. |
| 2009/0211441 A1 | 8/2009 | Reyes et al. |
| 2009/0217691 A1 | 9/2009 | Schmidt et al. |
| 2009/0294348 A1 | 12/2009 | Krogue et al. |
| 2009/0308248 A1 | 12/2009 | Siskin et al. |
| 2009/0326279 A1 | 12/2009 | Tonkovich et al. |
| 2010/0251887 A1 | 10/2010 | Jain |
| 2010/0263534 A1 | 10/2010 | Chuang |
| 2010/0326272 A1 | 12/2010 | Asaro et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |

FOREIGN PATENT DOCUMENTS

| | | |
|---|---|---|
| EP | 1080771 B1 | 10/2007 |
| JP | 2000317244 A | 11/2000 |
| JP | 2002326810 A | 11/2002 |
| WO | 92/05859 | 4/1992 |
| WO | 96/14917 | 5/1996 |
| WO | 02/087730 A2 | 11/2002 |
| WO | 2005/061100 A1 | 7/2005 |
| WO | 2008/000380 A1 | 1/2008 |
| WO | 2008/143826 A1 | 11/2008 |
| WO | 2008/143966 A1 | 11/2008 |
| WO | 2009/105251 A1 | 8/2009 |
| WO | 2010/064121 A8 | 6/2010 |
| WO | 2010/096916 A1 | 9/2010 |
| WO | 2010/130787 A1 | 11/2010 |

OTHER PUBLICATIONS

Suib, Steven L., O'Young, Chi-Lin "Synthesis of Octahedral Molecular Sieves and Layered Materials", Marcel Dekker, Inc., vol. 69 (1997), pp. 215-231.

Zhao, Dongyuan, Feng, Jianglin, Huo, Qisheng, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.

* cited by examiner

TEMPERATURE SWING ADSORPTION PROCESS FOR THE SEPARATION OF TARGET SPECIES FROM A GAS MIXTURE

CROSS-REFERENCE TO RELATED APPLICATION

This application claims priority to U.S. Provisional Ser. No. 61/447,848 filed Mar. 1, 2011, herein incorporated by reference in its entirety. This application further claims priority to related U.S. Ser. Nos. 61/447,806, 61/447,812, 61/447,824, 61/447,877, 61/447,869, and 61/447,835, each filed Mar. 1, 2011, and each being incorporated by reference herein in its entirety, as well as the six U.S. non-provisional applications filed on even date herewith and claiming priority thereto, each of which being additionally incorporated by reference herein in their entirety.

This application is further related to co-pending U.S. Ser. Nos. 61/448,117, 61/448,120, 61/448,121, 61/448,123, and 61/448,125, each filed Mar. 1, 2011, 61/594,824 filed Feb. 3, 2012, and the application entitled "Apparatus and Systems having a Rotary Valve Assembly and Swing Adsorption Processes Related Thereto" by Robert F. Tammera et al. filed on even date herewith, each being incorporated by reference herein in its entirety, as well as any U.S. non-provisional applications claiming priority thereto and presumably filed on even date herewith, each of which being additionally incorporated by reference herein in their entirety.

FIELD OF THE INVENTION

The present invention relates to a temperature swing adsorption process for the removal of a target species, such as an acid gas, from a gas mixture, such as a natural gas stream.

BACKGROUND OF THE INVENTION

Gas separation is important in many industries and can typically be accomplished by flowing a mixture of gases over an adsorbent that preferentially adsorbs a more readily adsorbed component relative to a less readily adsorbed component of the mixture. One of the more important types of gas separation technology is swing adsorption, such as pressure swing adsorption (PSA). PSA processes rely on the fact that under pressure gases tend to be adsorbed within the pore structure of the microporous adsorbent materials or within the free volume of a polymeric material. The higher the pressure, the greater the amount of targeted gas component will be adsorbed. When the pressure is reduced, the adsorbed targeted component is released, or desorbed. PSA processes can be used to separate gases of a gas mixture because different gases tend to fill the micropore or free volume of the adsorbent to different extents.

Another important gas separation technique is temperature swing adsorption (TSA). TSA processes also rely on the fact that under pressure gases tend to be adsorbed within the pore structure of the microporous adsorbent materials or within the free volume of a polymeric material. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Various methods of supplying heat to the adsorbent for the regeneration cycle have been proposed. These include microwave energy (U.S. Pat. No. 4,312,641), installation of electrical heaters inside the packed adsorbent bed of the adsorber (U.S. Pat. No. 4,269,611) and direct application of electric current to the adsorber for electrodesorption (U.S. Pat. No. 4,094,652). However, many of the conventional TSA processes have cycle times significantly long, often as long as 12 hours, which reduces the overall adsorption and processing capacity of the system.

TSA, as conventionally practiced, has several disadvantages. For example, in directly heated TSA processes, a hot fluid is typically flowed through the adsorption bed to raise the adsorbent temperature. The greater the temperature rise, the more fluid is needed. The desorbed impurities thus end up dispersed in a large volume of heating fluid, and the large amount of heat that is used to raise the adsorbent temperature is often not recoverable. In some cases, the heat is not recovered because many directly heated TSA systems are operated with long adsorption times (days) and much shorter regeneration times. Also, the occasional and gradual adsorption and regeneration cycles give rise to concentration and flow variations in downstream equipment that can be difficult to manage in an otherwise steady state process plant. Improper or inadequate regeneration of the adsorption beds can also significantly impact the overall purity of the product streams from the adsorption process. Heat management and the cyclic nature of the TSA processes also affect the overall system capacity and product purities.

Thus, there is a need in the art for temperature swing adsorption processes that can overcome at least some of these problems as well as having faster cycle times, leading to higher system capacities, while maintaining or improving the final product stream purity, especially with regard to temperature swing adsorption processes.

SUMMARY OF THE INVENTION

In accordance with a preferred embodiment of the present invention there is provided a temperature swing adsorption process for separating a target species from a feed gas mixture containing said target species, which process comprises: a) subjecting said feed gas mixture containing said target species to an adsorption step by introducing the feed gas mixture into the feed input end of an adsorbent bed that is comprised of an adsorbent material that is selective for adsorbing said target species, which adsorbent bed having a feed input end and a product output end, and which adsorbent bed is operated at a first pressure and at a first temperature wherein at least a portion of the said target species in the feed gas mixture is adsorbed by the adsorbent bed and wherein a gaseous product stream containing a lower mol % of said target species than said feed gas mixture exits the product output end of said adsorbent bed; b) stopping the introduction of said feed gas mixture to said adsorbent bed before breakthrough of said target species from the product output end of said adsorbent bed; c) reducing the pressure in said adsorption bed to a second pressure in a manner to induce a flow in the adsorption bed that is counter-current to the flow of the feed gas mixture in step a); d) externally heating said adsorbent bed to a second temperature higher than said first temperature while simultaneously passing a flow of purge gas, substantially free of target species, counter-current to the direction of the flow of the feed gas mixture in step a), thereby desorbing and recovering at least a portion of the desorbed target species and resulting in the product outlet end of said adsorbent bed being reduced in the amount of the target species; e) cooling at least a portion of said adsorbent bed to a third temperature which is lower than said second temperature used in step d); and f) increasing the pressure in said adsorbent bed to a third pressure.

In preferred embodiments, the first temperature can be from −195° C. to 300° C., and the first pressure can be from 1 bara to 600 bara. Additionally or alternately, the second temperature can be from 10° C. to 300° C.

Further additionally or alternately, the feed gas mixture can be a natural gas stream and/or the target species can be selected from $CO_2$ and $H_2S$.

DETAILED DESCRIPTION OF THE EMBODIMENTS

All numerical values within the detailed description and the claims herein are modified by "about" or "approximately" the indicated value, and take into account experimental error and variations that would be expected by a person having ordinary skill in the art.

The present invention relates to a thermal swing adsorption process capable of capturing target species, such as acid gases, e.g., predominantly $CO_2$ and/or $H_2S$, from natural gas streams. Thermal swing adsorption (TSA) processes employ an adsorbent contactor that is repeatedly cycled through at least two steps—an adsorption step and a thermally assisted regeneration step. Regeneration of the contactor can be achieved by heating the contactor to an effective temperature to desorb target components from the adsorbent. The contactor can then be cooled so that another adsorption step can be completed. In a preferred embodiment, the thermal swing adsorption process can be conducted with rapid cycles, in which case they are referred to as rapid cycle thermal swing adsorption (RCTSA). A rapid cycle thermal swing adsorption process is defined as one in which the cycle time between successive adsorption steps is less than about 10 minutes, preferably less than about 2 minutes, for example less than about 1 minute. RC-TSA processes can be used to obtain very high product recoveries in the excess of 90 vol %, for example greater than 95 vol % or, in some cases, greater than 98 vol %. The term "adsorption" as used herein includes physisorption, chemisorption, and condensation onto a solid support, absorption into a solid supported liquid, chemisorption into a solid supported liquid, and combinations thereof.

It can often be desirable to recover acid gases at higher pressures. The recovery of higher pressure acid gases can be desirable, for example, when $CO_2$ sequestration is planned. In such a case, desorption by TSA can be preferred over pressure swing adsorption. The present invention provides a means to rapidly change the contactor temperature without experiencing large heat losses, long heat-up and cool-down times, and/or adsorbate dilution. Temperature swing adsorption can be executed with fixed parallel channel contactors and associated valves, or by means of a rotary-based parallel channel contactor following the approach of a Ljungstrom heat exchanger.

Rapid cycle TSA operation can be facilitated with use of parallel channel contactors, e.g., where the adsorbent is on a surface of a compact heat exchange structure. Heating and cooling could take place in a channel isolated from the adsorbent. In such a configuration, a thermal wave can be made to move through the contactor during the adsorption step, which could allow for better separation of adsorbed gaseous components. In some instances, a chromatographic-like separation can be achieved (with no dilution from a carrier gas). This type of parallel channel contactor arrangement can be energy efficient. Thermal energy used in the swing adsorption process can be readily recovered and reused. Because of the energy efficiency, it can be possible to use a larger degree of thermal swing.

In some embodiments, the contactor can preferably be one in which the majority of the open pore volume is attributable to microporous pore diameters, e.g., in which less than 40%, more preferably less than 20%, for example less than 10%, of its open pore volume can originate from pore diameters greater than 20 angstroms and less than about 1 micron (i.e., from mesoporous and macroporous pore diameters). By "open pore volume" herein, it is meant all of the open pore space not occupied in the volume encompassed by the adsorbent material. The open pore volume includes all open spaces in the volume encompassed by the adsorbent material, including but not limited to all volumes within the adsorbent materials themselves, including the pore volume of the structured or amorphous materials, as well as any interstitial open volumes within the structure of the portion of the bed containing the adsorbent material. Open pore volume, as used herein, does not include spaces not accompanied by the adsorbent material such as open volumes in the vessel for entry, exit, or distribution of gases (such as nozzles or distributor areas), open flow channels, and/or volumes occupied by filler materials and/or solid heat adsorption materials. In preferred embodiments, the adsorbent can be incorporated into a parallel channel contactor. "Parallel channel contactors" are defined herein as a subset of adsorbent contactors comprising structured (engineered) adsorbents in which substantially parallel flow channels are incorporated into the adsorbent structure. Parallel flow channels are described in detail, e.g., in U.S. Patent Application Publication Nos. 2008/0282892 and 2008/0282886, both of which are incorporated herein by reference. These flow channels can be formed by a variety of ways, and, in addition to the adsorbent material, the adsorbent contactor structure may contain items such as, but not limited to, support materials, heat sink materials, void reduction components, and heating/cooling passages.

In the practice of the present invention, it can be desirable to operate with a multiplicity of contactor units, with several coupled in a heating/cooling operation and others involved in adsorption (and/or desorption). In such an operation, the contactor can be substantially cooled by a circulating heat transfer medium before it is switched into service for adsorption. One advantage of such an operation can be that the thermal energy used to swing the bed is retained in the heat transfer medium. If adsorption was to proceed simultaneously with cooling, then a substantial part of the heat in the bed could be lost to the adsorbate-free feed, and a higher heat load could be needed to restore the high temperature of the heat transfer medium.

The present invention can advantageously comprise an adsorption step in which the preferentially adsorbed components (target species) of the feed mixture are adsorbed by the adsorbent in an adsorbent bed, while recovering the less preferentially adsorbed components at the product end of the adsorbent bed at process pressures. The process pressure is the pressure at the outlet end of the contactor and can preferably be managed to be no more than 8 bara lower than the feed pressure (as measured at the entrance to the adsorbent bed), e.g., no more than 4 bara lower or no more than 1 bara lower. The adsorption step of the present invention can preferably be performed at a first temperature ranging from −195° C. to 300° C., preferably from 20° C. to 150° C. or from 30° C. to 120° C. Absolute pressures during the adsorption step can preferably be in a range from 1 bara to 600 bara, e.g., from 2 bara to 200 bara or from 10 bara to 150 bara. It can be preferred to manage the temperature rise from the heat of adsorption during the adsorption step. The system herein can be designed so that the heats of adsorption are in the range from 5 to 150 kJ/mole of molecules adsorbed. One method of managing the heat of adsorption can include incorporating a thermal mass into the adsorbent bed to mitigate the temperature rise that occurs during the adsorption step. The temperature rise from the heat of adsorption can be managed in a variety of ways, such as by flowing a cooling fluid through the passages external to the adsorbent bed (i.e., the passages that are used to heat and cool the contactor).

Additionally or alternately, the passages external to the adsorbent bed can be filled with a fluid that is not flowing during the adsorption process. In this case, the heat capacity of the fluid can serve to mitigate the temperature rise in the adsorbent bed. Combinations of some or all of these heat management strategies can be employed. Even with these heat management strategies, during this step, the final temperature of the bed can typically be slightly higher than the feed inlet temperature. Preferably, the maximum temperature rise at any point within the contactor can be less than 40° C., e.g., less than 20° C., less than 10° C., or less than 5° C. During adsorption, the strongest-adsorbing components can tend to attach most strongly to the adsorbent and can thus be least mobile. Such strongest-adsorbing components can thus tend to occupy regions of adsorbent closest to the inlet and can generally displace weakly adsorbed components from those regions.

Over the period of adsorption, the adsorbates can tend to order themselves from strongest to weakest, moving from inlet to outlet of the adsorption channels of the contactor. In preferred embodiments, the feed gas velocity can be chosen so that a relatively sharp concentration front moves through the contactor, i.e., such that the concentration gradient of adsorbate(s) extends over a relatively short distance, taking into consideration the absolute amplitude of the gradient.

The adsorption step can be stopped at a predetermined point before the adsorption front breaks through the product output end of the adsorbent bed. In certain preferred embodiments, the adsorption front can move at least 30% of the way down the bed, e.g., at least 50% or at least 80%, before the adsorption step is stopped. Additionally or alternately, the adsorption step can be conducted for a fixed period of time set by the feed flow rate and adsorbent capacity. Further additionally or alternately, the adsorption step can be conducted for a time less than 600 seconds, preferably less than 120 seconds, e.g., less than 40 seconds or less than 10 seconds. In some instances, the adsorption front can be allowed to break through the output end only for a short duration (e.g., for at most a few seconds), but it is usually preferred that the adsorption front not be allowed to break through.

The term "break-through" is defined herein as the point where the product gas leaving the adsorbent bed exceeds the target specification of the contaminant component. At the break through point, the adsorbent bed can be considered "spent", such that any significant further operation through the spent adsorption bed alone will result in off-specification product gas. As used herein, the "breakthrough" can generally coincide with the "adsorption front", i.e., at the time breakthrough is detected at the outlet of the adsorbent bed, the adsorption front is generally located at the end of the adsorption bed.

The pressure in the adsorbent bed can then be reduced, preferably in a series of blow-down steps in which gas flows in a co-current or counter-current direction, which can be performed with or without a purge gas stream to the final target gas recovery pressure. Pressure reduction can typically occur in no more than 8 steps, e.g., no more than 4 steps, with target species being optionally but preferably recovered in each step. In certain embodiments, the pressure can advantageously be decreased by a factor of approximately three in each step. Additionally or alternately, the depressurization can be conducted counter-currently and/or, during the depressurizing step, a purge gas be passed counter-current (from product end to feed end) through the adsorbent bed. In embodiments where a purge gas is used, the purge gas can preferably be a so-called "clean gas", which is a gas substantially free of target gas components. For example, if the target gas is an acid gas such as $H_2S$ and $CO_2$, then the clean gas can be a stream substantially free of such acid gas(es). Additionally or alternately, the clean gas can contain less than 5 mol % of combined $H_2S$ and $CO_2$, e.g., less than 1 mol %. One example of a clean gas could be the product gas itself. When the current invention is utilized for the removal of acid gas from a natural gas stream, the clean gas can be comprised of at least one of the hydrocarbon product streams, can be comprised of $C_{3-}$ hydrocarbons, can be comprised of methane, and/or can be comprised of nitrogen.

In some preferred embodiments where a clean gas is used, in any step other than the adsorption step, the clean gas can be conducted counter-currently through the adsorbent bed to ensure that the end of the bed is substantially free of target species. Additionally or alternately, the clean gas can be conducted counter-currently through the adsorbent bed in at least a portion (e.g., in all) of the desorption steps. An effective rate of counter-current flowing clean gas can be necessary during these step(s) to overcome mass diffusion to ensure that the product end of the bed is kept substantially free of target species.

After the blow-down step(s), the adsorbent bed can be at a desired reduced pressure and can thus be externally heated, if desired. By "externally heated" we mean that heat is not applied directly to the adsorbent bed through the flow channels through which the feed gas mixture had flowed and into which the target gas component will be desorbed. The heat can preferably be delivered to the adsorbent bed through a plurality of heating/cooling channels not in fluid communication with the feed gas flow channels of the adsorbent. The adsorbent bed can be externally heated co-currently or counter-currently along its length with respect to the flow of the feed gas mixture, or in a combination of co-current and counter-current heating steps. If there are very strongly adsorbed species near the inlet end of the contactor, it can be preferred to first heat the inlet end and then counter-currently heat the remainder of the contactor. If the desorption step is conducted counter-currently, the species desorbed from the remainder of the contactor can facilitate desorption of residual amounts of adsorbed species near the inlet end. In most other embodiments, it can be preferred to counter-currently heat the adsorbent bed to improve regeneration at the product end of the contactor (or bed). The flow channels that will carry heating and cooling fluid can preferably be in physical contact with the adsorbent bed to enhance heat transfer. The adsorbent bed can be heated to a second temperature higher than the first temperature used during the adsorption step, the second temperature preferably being from 10° C. to 300° C., e.g., from 20° C. to 200° C. or from 40° C. to 120° C. A purge stream of clean gas can be passed counter-currently through the adsorbent bed during heating to keep the product end of the bed substantially free of target species. The purge stream can preferably be introduced at a pressure higher than the pressure in the adsorbent bed. Additionally or alternatively, the total number of moles of purge gas introduced can be less than five times the number of moles of molecules adsorbed in the contactor, e.g., less three times or less than 0.1 times. Target species can be recovered during any part(s) of the heating step.

The external heating can be conducted such that a thermal wave is used to pass heat through the contactor, as it transitions from the adsorption step to the regeneration step, in transitioning from the regeneration to adsorption step, in at least part of the regeneration step, and/or in at least part of the adsorption step. Similarly, it can be preferred to utilize a thermal wave in the cooling step. The use of a thermal wave in temperature swing adsorption is disclosed in detail in U.S. Patent Application Publication No. 2008/0314245, which is incorporated herein by reference. A thermal wave is a relatively sharp temperature gradient, or front, that can move linearly (i.e., approximately in a single direction within the contactor) during at least one step in the thermal swing adsorption/desorption cycle. The speed at which the thermal front (i.e., region with sharp temperature gradient) can move is referred to as the thermal wave velocity. The thermal wave velocity need not be constant, and the thermal wave direction need not be the same in both adsorption and regeneration steps. For example, the wave can move co-currently, counter-currently, or cross-flow in the adsorption and/or regeneration steps. It is also possible to design a process in which there is no significant thermal wave present in the adsorption step while there is a significant thermal wave in the regeneration step. The presence of a thermal wave in at least some portion of the thermal swing adsorption/regeneration cycle can enable the overall system to achieve a goal of substantially recuperating and recovering the heat required to temperature-swing the adsorbent bed. This, in turn, can improve process efficiency and/or can enable the use of high desorption temperatures that would not normally be considered for TSA operation.

In a preferred embodiment of the present invention the contactor is combined with an adsorbent into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. Preferably, the heat adding/removing channels can be designed and operated in a manner that results in a relatively sharp temperature wave in both the adsorbent and in the heating and cooling fluids during the heating and cooling steps in the cycle. An example of a contactor that can produce a relatively sharp thermal wave is a contactor according to the present invention.

Thermal waves in such contactors can be produced in when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

In a preferred embodiment, during the heating step, the volume of fluid at a temperature no more than 10° C. warmer than the end of the contactor from which it is produced can represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternately, during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, it can be preferred that the recovered energy be used to reduce the amount of sensible heat that must be supplied to heat and cool the contactor. The sensible heat is determined by the heat capacity and temperature rise (or fall) of the contactor. In some preferred embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

After the target gas has been recovered, the adsorbent bed can be cooled and repressurized. It can generally be preferred to cool the bed before repressurization. The adsorbent bed can be cooled, preferably to a temperature that is no more than 40° C. above the temperature of feed gas mixture, e.g., no more than 20° C. above or no more than 10° C. above. Additionally or alternately, the adsorbent bed can be cooled by external cooling in a co-current or counter-current manner, such that a thermal wave can pass through the bed. In some such embodiments, it can be preferred for the first part of the adsorbent bed to be cooled then repressurized. In those embodiments, less than 90% of the length of adsorption bed can be cooled, e.g., less than 50%. The adsorbent bed can additionally or alternately be purged with a clean gas during cooling.

Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$ ($T_{10}$) and about 10% below $T_{max}$ ($T_{90}$). Thermal waves can be said to be relatively sharp when at least the temperature differential of ($T_{90}$–$T_{10}$) occurs over at most 50% (e.g., at most 40%, at most 30%, or at most 25%) of the length of the apparatus that participates in the mass/thermal transfer. Additionally or alternately, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as (U*L)/α, where U represents the velocity of the heating/cooling fluid (in m/s), L represents a characteristic distance over which heat is transported (to warm/cool the adsorbent) in a direction roughly perpendicular to the fluid flow, and α represents the effective thermal diffusivity of the contactor (in $m^2$/s) over the distance L. In addition or alternatively to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1 m/s to about 50 m/s or from about 1 m/s to about 40 m/s. Additionally or alternately, to minimize size and energy requirements, it can be preferred for L to be less than 0.1 meter, e.g., less than 0.01 meter or less than 0.001 meter.

The adsorbent bed can then be repressurized, during and/or after the cooling step, e.g., using clean product gas or countercurrently with blow-down gas from another bed after a first stage of repressurization. The final pressure of the repressurization step can preferably be substantially equal to the pressure of the incoming feed gas mixture.

In one preferred embodiment, the processes of the present invention can be used to separate acid gases from a natural gas stream. Practice of rapid cycle swing adsorption of the present invention can be used to replace conventional amine scrubbing for natural gas processing. In order for TSA to remove acid gases, especially $H_2S$, in concentrations greater than 1000 ppm, from natural gas streams in a more economical way, the processes of the invention can advantageously include one or more of the following items:

I. Preferred adsorbents for the removal of acid gases can be selected from mesoporous and/or microporous materials, with or without functionality for chemical reactions with acid gases. Examples of materials without functionality can include high-silica zeolites, cationic zeolites, stannosilicates, and the like, as well as combinations thereof. Functionalized materials that chemically react with $H_2S$ and/or $CO_2$ can exhibit significantly increased selectivity for $H_2S$ and/or $CO_2$ over hydrocarbons in natural gas, such as methane, and can advantageously not catalyze undesirable reactions with hydrocarbons that can typically occur with acidic zeolites. Functionalized mesoporous adsorbents can tend to have a reduced affinity toward hydrocarbons, as compared to unfunctionalized smaller pore materials, such as zeolites. Nevertheless, adsorption of heavy hydrocarbons can be kinetically suppressed by using smaller pore functionalized materials, in which diffusion of heavy hydrocarbons is slow compared to $H_2S$ and $CO_2$. It can be important in some embodiments to reduce condensation of hydrocarbons with $C_{4+}$ hydrocarbons on external surfaces of $H_2S$— and/or $CO_2$— selective adsorbents. Non-limiting examples of functional groups suitable for use herein include primary, secondary, and tertiary amines, as well as other non-protogenic, basic groups such as amidines, guanidines, and biguanides, and the like, and combinations thereof. In some embodiments, functionalized materials can be functionalized with two or more types of functional groups.

To obtain substantially complete removal of $H_2S$ and/or $CO_2$ from natural gas streams, an adsorbent material can ideally be selective for $H_2S$ and/or $CO_2$ but have a relatively low capacity for both methane and heavier hydrocarbons ($C_{2+}$). One way to achieve selectivity can be to use amines supported on silica-based or other supports, because they tend to have strong adsorption isotherms for acid gas species, relatively high adsorption capacities for such species, and, as a consequence of their relatively high heats of adsorption, relatively strong temperature responses (i.e., when sufficiently heated they can readily desorb $H_2S$ and/or $CO_2$ and can thus be used without excessive temperature swings). Preferred adsorbents can effectively adsorb in the 25° C. to 70° C. range and effectively desorb in the 90° C. to 140° C. range.

In systems requiring different adsorbents for $CO_2$ and/or $H_2S$ removal, a layered bed comprising a suitable adsorbent for the targeted species may be desirable. A mesophase filler described below may be effective in reducing available surface area.

II. Parallel channel contactors can be used, such that gas/solid contacting can occur in relatively small-diameter adsorbent-lined channels. This structure of the contactor can provide at least some of the benefits of rapid adsorption kinetics through reduction/minimization of gas film resistance and relatively high gas-solid communication. Preferred adsorber designs can have the capability of generating a relatively sharp adsorption front. One key to adsorption of trace components down to essentially zero gas concentrations can include very rapid gas-to-adsorbent kinetics, i.e., the distance through which the target species must diffuse to make contact with the adsorbent wall is kept short, preferably less than 1000 microns, for example less than 200 microns or less than 100 microns. In order to achieve this requirement, while limiting bed pressure drop to acceptable values, parallel channel contactors can be used to confine the feed and purge gases to a plurality of very narrow (1000 micron to 30 micron diameter) open channels lined to an effective thickness of the adsorbent material. By effective thicknesses is meant a range from about 500 microns to 30 microns for most applications. In the most limiting case of laminar gas flow, the very narrow channels can limit the maximum diffusion distance for a trace species to no more than ½ the diameter of the channel. Even when adsorbing the desired species at the leading edge of the adsorption front, where their concentrations can approach zero in the gas phase, a relatively sharp adsorption front can be maintained by using such small diameter parallel channel structured adsorption bed configurations. Such a configuration can be in the form of multiple independent parallel channels, or in the form of very wide, very short channels, as may be achieved by using a spiral wound design.

III. A means for rapidly heating and cooling the adsorbent bed structure can be important for adsorption to occur at lower temperatures and desorption at higher temperatures. The adsorption step can then occur at high relative pressures, and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme. By "internally temperature controlled" is meant the use of a heating and cooling fluid media, gaseous and/or liquid (preferably including liquid), that can be circulated through the same adsorbent lined channels utilized for the gaseous feed flow. Internal temperature control can require that the adsorbent material not be significantly adversely affected by the temperature control fluid and that the temperature control fluid be easily separated from the previously adsorbed species ($H_2S$ and/or $CO_2$) following the heating step. Further, for internal temperature control, the pressure drop across each of the parallel channels in the structured bed during the gaseous feed adsorption step can typically be sufficiently high in order to clear each channel (or the single channel in the case of spiral wound designs) of the temperature control fluid. Additionally, internal fluid flow temperature designs can preferably utilize an adsorbent that does not strongly adsorb the temperature control fluid, so that $H_2S$ and/or $CO_2$ may be usefully adsorbed even in the presence of the temperature control fluid. Non-limiting examples of such adsorbents can include amine-functionalized microporous and/or mesoporous adsorbents.

A non-limiting example of such a system can include supported amines on a water stable support with the use of hot and cold water (pressurized liquid or used as steam for heating) for heating and cooling. Whereas liquid water can be left within the adsorbent wall during the adsorption step, when the thickness of the adsorbent wall is kept small (e.g., less than 1000 microns, less than 200 microns, or less than 100 microns), $H_2S$ and/or $CO_2$ can advantageously diffuse through the liquid water in time scales less than 1 minute, for example less than 10 seconds, to become adsorbed by the supported amine. Following the desorption step, $H_2S$ and/or $CO_2$ can be easily separated using fractionation and/or other methods known to those skilled in the art.

By "external temperature control" is meant wherein the heating and cooling fluid is kept from contact with the gas carrying adsorbent channels. Such a structure can resemble a tube and shell heat exchanger, plate and frame heat exchanger, hollow fibers with a fluid impermeable barrier layer on the outer or inner diameter, or any other suitable structure. In order to obtain rapid heating and cooling, the distance through which the heat must diffuse from the temperature control fluid to the adsorbent layer can advantageously be kept to a minimum, ideally less than 10,000 microns, e.g., less than 1000 microns or less than 200 microns.

A non-limiting example of an external temperature control bed design can include hollow fibers with a fluid impermeable barrier layer on the outer diameter, wherein the hollow fibers are comprised of a mixed matrix system of polymeric and supported amine adsorbents. Feed gas could be passed through the inner diameter of the porous fibers to be adsorbed by the adsorbent at lower temperatures, while cool temperature control fluid can flow over the outer diameters of the fibers. Desorption could be accomplished by passing hot temperature control fluid, preferably in a counter-current direction over the fibers outer diameter, thus heating the adsorbent. The cycle can be completed by exchanging the hot temperature control fluid with cold fluid to return the fiber containing the adsorbent to the desired adsorption temperature. In a preferred embodiment, the rate of heat flow in the system could be such that a relatively sharp temperature gradient in the temperature control fluid can be established during heating and cooling, such that as much as possible of the sensible heat of the system can be recuperated from the heating and cooling fluids. For such a non-limiting hollow fiber example, the useful fiber outer diameter dimensions can be less than 20,000 microns, preferably less than 2000 microns, for example less than 1000 microns. The useful hollow fiber inner diameters (the feed gas channels) can be less than 10,000 microns, e.g., less than 1000 microns or less than 500 microns, as suitable based on the desired adsorption and desorption cycle times, feed adsorbed species concentrations, and adsorbent layer swing capacity for those species.

In all cases, it can be advantageous to keep the ratio of non-adsorbing thermal mass in the adsorbent bed to adsorbent as low as possible. This ratio can be less than 20, for example less than 10 or less than 5. In this manner, the sensible heat of the system that must be swung in each cycle may be reduced/minimized.

IV. A relatively low flow (about 0.01% to about 5% of the total feed flow) of a clean gas, substantially free of $H_2S$ and/or $CO_2$ can be utilized as a purge gas. Non-limiting examples of such clean gas flows can include methane and nitrogen that are maintained flowing through the parallel channels in a direction counter-current to the feed direction during at least a portion of the desorption steps of the process. Advantageously, the flow rate of this clean gas can be sufficient to overcome the natural diffusion of the desorbing $H_2S$ and/or $CO_2$ to maintain the product end of the adsorbing channel in a substantially clean condition. This counter-current purge flow during desorption can ensure that, on each subsequent adsorption cycle, target species, such as $H_2S$ or $CO_2$, do not substantially bleed through into the product stream.

As previously mentioned, a preferred cycle and bed design for the practice of the present invention can be for the product end of the adsorbent channels (i.e., the end opposite the end where feed gases enter) to have an extremely low, or ideally essentially zero, concentration of adsorbed $H_2S$ and/or $CO_2$. In this manner, and with suitable structured channels as described above, the $H_2S$ and/or $CO_2$ can be rigorously removed from the feed gas stream. For instance, with respect to $H_2S$, rigorous removal occurs in an adsorption process when the product gas contains no more than 4 vppm $H_2S$ (e.g., no more than 3 vppm, no more than 2 vppm, or no more than 1 vppm) and the gas feed stream input contains between 6 vppm and 10,000 vppm $H_2S$ (e.g., from 8 vppm to 10,000 vppm, from 10 vppm to 10,000 vppm, from 15 vppm to 10,000 vppm, from 20 vppm to 10,000 vppm, from 30 vppm to 10,000 vppm, from 50 vppm to 10,000 vppm, from 100 vppm to 10,000 vppm, from 6 vppm to 5000 vppm, from 8 vppm to 5000 vppm, from 10 vppm to 5000 vppm, from 15 vppm to 5000 vppm, from 20 vppm to 5000 vppm, from 30 vppm to 5000 vppm, from 50 vppm to 5000 vppm, from 100 vppm to 5000 vppm, from 6 vppm to 2000 vppm, from 8 vppm to 2000 vppm, from 10 vppm to 2000 vppm, from 15 vppm to 2000 vppm, from 20 vppm to 2000 vppm, from 30 vppm to 2000 vppm, from 50 vppm to 2000 vppm, from 100 vppm to 2000 vppm, from 6 vppm to 1000 vppm, from 8 vppm to 1000 vppm, from 10 vppm to 1000 vppm, from 15 vppm to 1000 vppm, from 20 vppm to 1000 vppm, from 30 vppm to 1000 vppm, from 50 vppm to 1000 vppm, or from 100 vppm to 1000 vppm).

The downstream end of the bed can be kept clean as described by maintaining a relatively low flow of a clean fluid substantially free of $H_2S$ and/or $CO_2$, in a counter-current direction relative to the feed direction, during the desorption step(s), or more preferably during all the heating and cooling steps in the cycle. In some embodiments, during the adsorption step, the adsorption part of the cycle can be limited to a time such that the advancing adsorption front of $H_2S$ and/or $CO_2$ loaded adsorbent not reach the end of the channels, i.e., adsorption to be halted prior to $H_2S$ and/or $CO_2$ breakthrough so that a substantially clean section of the adsorbent channel can remain substantially free of target species. With reasonably sharp adsorption fronts, this can allow more than 50 vol % of the adsorbent to be utilized, e.g., more than 75 vol % or more than 85 vol %.

V. Optionally, a mesophase filler can be used. That is, the non-sweepable void space between the crystals and/or pores within the adsorbing channel wall can be reduced by filling the mesophase pores between the particles to reduce the open volume while allowing relatively rapid gas transport throughout the adsorbent layer. This filling of the non-sweepable void space can be desired to reduce to acceptable levels the quantity of desired product, lost during the rapid desorption step, as well as to allow a high degree of adsorber bed purity following thermal desorption. Such mesophase pore filling can be accomplished in a variety of ways. For example, a polymer filler can be used with rapid diffusion of $H_2S$ and/or $CO_2$, such as a silicon rubber or a polymer with intrinsic porosity. Additionally or alternately, the void space can be filled with a pyrolitic carbon having mesoporosity and/or microporosity, with inert solids of smaller and smaller sizes, and/or with a replenishable liquid through which the desired gases can relatively rapidly diffuse (such as water, solvents, oil, or the like). Whatever the method, the void space within the adsorbent wall can advantageously be reduced to less than 60 vol %, e.g., to less than 70% or to less than 80%.

Additionally or alternately, a purge gas stream can be passed through the adsorbent bed during heating to keep the product end of the bed relatively (substantially) free of target gas component(s). In certain preferred embodiments, the purge gas stream can have a substantially lower content of the target gas component(s) than the feed gas mixture, e.g., the purge gas stream can have a content less than 10 mol %, for example less than 5 mol %, of the target gas component in the feed gas mixture.

In preferred applications of the present contactors, $CO_2$ can be removed from natural gas in the swing adsorption process. Here, it can be preferred to formulate the adsorbent with a specific class of 8-ring zeolite materials that has a kinetic selectivity, though equilibrium-based adsorption can be an alternative. The kinetic selectivity of this class of 8-ring zeolite materials can allow $CO_2$ to be rapidly transmitted into zeolite crystals while hindering the transport of methane, so that it is possible to selectively separate $CO_2$ from a mixture of $CO_2$ and methane. For the removal of $CO_2$ from natural gas, this specific class of 8-ring zeolite materials can have an Si/Al ratio from about 1 to about 25, or alternately from 2 to about 1000, from about 10 to about 500 or from about 50 to about 300. As used herein, the Si/Al ratio is defined as the molar ratio of silica to alumina of the zeolitic structure. This class of 8-ring zeolites can allow $CO_2$ to access the internal pore structure through 8-ring windows in a manner such that the ratio of single component diffusion coefficients for $CO_2$ over methane (i.e., $D_{CO2}/D_{CH4}$) can be greater than 10, preferably greater than about 50, greater than about 100, or greater than about 200.

Additionally or alternately, in many instances, nitrogen may desirably be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas, like with $CO_2$, it can be preferred to formulate the adsorbent with a class of 8-ring zeolite materials that has a kinetic selectivity. The kinetic selectivity of this class of 8-ring materials can allow $N_2$ to be rapidly transmitted into zeolite crystals while hindering the transport of methane, so that it is possible to selectively separate $N_2$ from a mixture of $N_2$ and methane. For the removal of $N_2$ from natural gas, this specific class of 8-ring zeolite materials can have an Si/Al ratio from about 2 to about 1000, e.g., from about 10 to about 500 or from about 50 to about 300. This class of 8-ring zeolites can allow $N_2$ to access the internal pore structure through 8-ring windows in a manner such that the ratio of single component diffusion coefficients for $N_2$ over methane (i.e., $D_{N2}/D_{CH4}$) can be greater than 5, preferably greater than about 20, greater than about 50, or greater than 100. Resistance to fouling in swing adsorption processes during the removal of $N_2$ from natural gas can be one advantage offered by this class of 8-ring zeolite materials.

Additionally or alternately from $CO_2$, it can be desirable to remove $H_2S$ from natural gas which can contain from about 0.001 vol % $H_2S$ to about 70 vol % $H_2S$ (e.g., from about 0.001 vol % to about 30 vol %, from about 0.001 vol % to about 10 vol %, from about 0.001 vol % to about 5 vol %, from about 0.001 vol % to about 1 vol %, from about 0.001 vol % to about 0.5 vol %, or from about 0.001 vol % to about 0.1 vol %). In this case, it can be advantageous to formulate the adsorbent with stannosilicates, as well as the aforementioned class of 8-ring zeolites that can have kinetic selectivity. The kinetic selectivity of this class of 8-ring materials can allow $H_2S$ to be rapidly transmitted into zeolite crystals while hindering the transport of methane, so that it is possible to selectively separate $H_2S$ from a mixture of $H_2S$ and methane. For the removal of $H_2S$ from natural gas, this specific class of 8-ring zeolite materials can have a Si/Al ratio from about 2 to about 1000, e.g., from about 10 to about 500 or from about 50 to about 300. This class of 8-ring zeolites can allow $H_2S$ to access the internal pore structure through 8-ring windows in a manner such that the ratio of single component diffusion coefficients for $H_2S$ over methane (i.e., $D_{H2S}/D_{CH4}$) can be greater than 5, preferably greater than about 20, greater than about 50, or greater than 100. DDR, Sigma-1, and/or ZSM-58 are examples of suitable materials for the removal of $H_2S$ from natural gas. In some applications, it can be desired for $H_2S$ to be removed to the ppm or ppb levels.

Other non-limiting examples of selective adsorbent materials for use in embodiments herein can include microporous materials such as zeolites, AlPOs, SAPOs, MOFs (metal organic frameworks), ZIFs (zeolitic imidazolate frameworks, such as ZIF-7, ZIF-8, ZIF-22, etc.), and carbons, as well as mesoporous materials such as amine functionalized MCM materials, and the like, and combinations and reaction products thereof. For acidic gases such as hydrogen sulfide and carbon dioxide typically found in natural gas streams, adsorbents such as cationic zeolites, amine-functionalized mesoporous materials, stannosilicates, carbons, and combinations thereof can be preferred, in certain embodiments.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described herein and in U.S. Provisional Application No. 61/447,858, filed Mar. 1, 2011, which is incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-TSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;

(h) using feed compression before one or more RC-TSA units to achieve a desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high hydrocarbon recovery as compared to conventional technology.

Additionally or alternately, the invention can comprise one or more of the following embodiments.

Embodiment 1. A temperature swing adsorption process for separating a target species from a feed gas mixture containing said target species, which process comprises: a) subjecting said feed gas mixture containing said target species to an adsorption step by introducing the feed gas mixture into the feed input end of an adsorbent bed that is comprised of an adsorbent material that is selective for adsorbing said target species, which adsorbent bed having a feed input end and a product output end, and which adsorbent bed is operated at a first pressure and at a first temperature wherein at least a portion of the said target species in the feed gas mixture is adsorbed by the adsorbent bed and wherein a gaseous product stream containing a lower mol % of said target species than said feed gas mixture exits the product output end of said adsorbent bed; b) stopping the introduction of said feed gas mixture to said adsorbent bed before breakthrough of said target species from the product output end of said adsorbent bed; c) reducing the pressure in said adsorption bed to a second pressure in a manner to induce a flow in the adsorption bed that is counter-current to the flow of the feed gas mixture in step a); d) externally heating said adsorbent bed to a second temperature higher than said first temperature while simultaneously passing a flow of purge gas, substantially free of target species, counter-current to the direction of the flow of the feed gas mixture in step a), thereby desorbing and recovering at least a portion of the desorbed target species and resulting in the product outlet end of said adsorbent bed being reduced in the amount of the target species; e) cooling at least a portion of said adsorbent bed to a third temperature which is lower than said second temperature used in step d); and f) increasing the pressure in said adsorbent bed to a third pressure.

Embodiment 2. The process of embodiment 1 wherein the first temperature is from −195° C. to 300° C. (e.g., from 20° C. to 150° C.) and the first pressure is from 1 bara to 600 bara (e.g., from 2 bara to 200 bara), wherein the second temperature is from 10° C. to 300° C. (e.g., from 20° C. to 200° C.), and/or wherein the third temperature is from −195° C. to 300° C.

Embodiment 3. The process of embodiment 1 or embodiment 2 wherein the feed gas mixture is a natural gas stream and/or wherein the target species is selected from the group consisting of $CO_2$, $H_2S$, and a combination thereof.

Embodiment 4. The process of embodiment 3, wherein the target species comprises $H_2S$, wherein the product outlet end of said adsorbent bed contains no more than 4 vppm $H_2S$, and wherein the feed gas mixture contains between 6 vppm and 10,000 vppm $H_2S$.

Embodiment 5. The process of any one of the previous embodiments wherein the product outlet end of said adsorbent bed is substantially free of the target species (e.g., where the target species concentration is less than 2 vppm, alternately less than 1 vppm).

Embodiment 6. The process of any one of the previous embodiments wherein the adsorbent bed has open flow channels throughout its entire length through which the feed gas mixture is passed and/or wherein the adsorbent bed is a parallel channel contactor.

Embodiment 7. The process of any one of the previous embodiments wherein reduction in pressure of step c) takes place in two or more steps wherein each step reduces the pressure of the adsorbent bed to a lower pressure than the next previous step.

Embodiment 8. The process of any one of the previous embodiments wherein the external heating of step d) takes place co-current to the direction of gas flow through the adsorbent bed, or alternately counter-current to the direction of gas flow through the adsorbent bed.

Embodiment 9. The process of any one of the previous embodiments wherein the adsorbent material is an 8-ring zeolite having an Si/Al ratio greater than about 500, e.g., selected from the group consisting of DDR, Sigma-1, ZSM-58, and combinations and intergrowths thereof.

Embodiment 10. The process of any one of the previous embodiments wherein the heating of step d) is performed in such a way as to cause a thermal wave to travel along the adsorbent bed, e.g., co-current to the direction gas flow through the adsorbent bed.

Embodiment 11. The process of embodiment 10 wherein a $T_{90}$ and a $T_{10}$ can be defined with respect to the second temperature and the first temperature such that a temperature differential of $(T_{90}-T_{10})$ occurs over at most 50% of the length of the adsorbent bed.

Embodiment 12. The process of embodiment 10 or embodiment 11 wherein the thermal wave exhibits a maximum Peclet number, Pe, less than 10, wherein Pe=(U*L)/α, where U represents a heat exchange fluid velocity, L represents a characteristic distance over which heat is transported in a direction roughly perpendicular to fluid flow, and α represents an effective thermal diffusivity of the contactor over the distance L, and wherein U is from about 0.01 m/s to about 100 m/s, and L is less than 0.1 meter.

Embodiment 13. The process of any one of the previous embodiments wherein less than about 40% of the open pores of the adsorbent bed have diameters greater than about 20 Angstroms and less than about 1 micron.

Embodiment 14. The process of any one of the previous embodiments wherein said third pressure is between 90% and 100% of the absolute pressure of the feed gas mixture The following conceptual example is presented to illustrate embodiments of the present invention and is not meant to necessarily limit the scope of the claimed invention.

EXAMPLE

Prophetic Example for Removal of $H_2S$ and $CO_2$ from Natural Gas

As a prophetic example of a rigorous $H_2S$ and $CO_2$ removal case, mass and energy balances have been calculated for a natural gas cleanup scenario where:
a. Feed rate is ~690 million standard cubic feet per day (~690 MSCFD) at a feed pressure of ~810 psia.
b. An $H_2S$ concentration of ~2.1 molar percent.
c. A $CO_2$ concentration of ~0.32 molar percent.
d. A selective adsorbent supported on a monolithic structure is used wherein:
  i. There are square channel openings prior to wash-coating with adsorbent ~450 microns on one side.
  ii. ~25% of the channels are waterproofed and used to carry pressurized water as the heat transfer fluids.
  iii. The ~75% gas carrying channels are wash-coated with an adsorbent material having a capacity at process conditions of ~3.0 moles/kg (for $H_2S$ plus $CO_2$)
  iv. The adsorbent layer further includes silicon rubber as a mesophase-filling component, such that ~⅔ of the wash-coated layer is adsorbent and the remaining ~⅓ is the mesophase filler.
  v. The final gas carrying channel is ~150 microns diameter and roughly circular in cross section.
e. The overall system utilizes approximately 24 structured adsorbent beds as described above, cylindrical in shape of dimensions ~36 inch diameter, ~36 inches in length. They are grouped in sets of 8 such that at any time 8 beds are adsorbing, 8 thermally desorbing, and 8 are being cooled. (For this simplified example, the time and bed requirements for intermediate pressure blow-downs and pressure equalizations are ignored.)
f. The overall cycle time is ~60 seconds, roughly equally divided into adsorption, heating, and cooling steps.
g. It is assumed that only ~75% of the bed capacity, i.e., length down the adsorbing channel, is utilized in order to maintain the back end (downstream end) of the bed clean.
h. A back-flowing $N_2$ purge stream (clean gas) is utilized with a flow rate roughly equal to ~0.05% of the feed gas rate.
i. There is a pressure drop across the beds of approximately 5 bar during the adsorption step.
j. The discharged $H_2S$ plus $CO_2$ is recovered at approximately 3 bar.

A summary of the mass and energy balances for the above conceptual system of this Example is shown in Table 1 below.

TABLE 1

| Process Streams | Units | Inlets | | Product | Exhaust | Internal Recycle | |
|---|---|---|---|---|---|---|---|
| | | Sour Feed | Purge Inlet | Sweet Gas | Acid Gas | Recycle Out | To Feed |
| Phase | | V | V | V | V | V | V |
| Flow (total) | MSCFD | 690 | 0.33 | 673 | 17 | 0.69 | 0.69 |
| | lb-mole/h | 75800 | 36.6 | 73900 | 1900 | 75.8 | 75.8 |
| Pressure | psia | 810 | 79 | 728 | 34 | 16 | 810 |
| Temperature | °F. | 115 | 131 | 131 | 248 | 115 | 115 |
| Composition [Mol % (ppm)] | | | | | | | |
| Nitrogen | | 0.22 | 0.23 | 0.23 | 0.0066 | 0.22 | 0.22 |
| CO2 | | 0.32 | 0 | 0 | 13 | 0.32 | 0.32 |
| H2S | | 2.09 | 0 | 0 | 84.9 | 2.1 | 2.1 |
| Methane | | 87.4 | 89.5 | 89.5 | 1.8 | 87.4 | 87.4 |
| Ethane | | 6.57 | 6.73 | 6.73 | 0.14 | 6.57 | 6.57 |
| Propane | | 2.31 | 2.37 | 2.37 | 0.048 | 2.31 | 2.31 |
| i-Butane | | 0.36 | 0.37 | 0.37 | (73.9) | 0.36 | 0.36 |
| n-Butane | | 0.53 | 0.54 | 0.54 | 0.011 | 0.53 | 0.53 |
| i-Pentane | | 0.11 | 0.11 | 0.11 | (22.8) | 0.11 | 0.11 |
| n-Pentane | | 0.089 | 0.092 | 0.092 | (18.5) | 0.089 | 0.089 |
| n-Hexane | | 0.025 | 0.025 | 0.025 | (5.1) | 0.025 | 0.025 |
| n-Heptane | | 0.003 | (30.7) | (30.7) | (0.02) | 0.003 | 0.003 |
| n-Octane | | 0.0003 | (2.9) | (2.9) | 0 | 0.0003 | 0.0003 |
| COS | | 0.001 | (10) | (10) | 0 | 0.001 | 0.001 |
| Methyl —SH | | 0.006 | (61.4) | (61.4) | (0.01) | 0.006 | 0.006 |
| Ethyl —SH | | 0.0024 | (24.7) | (24.7) | 0 | 0.0024 | 0.0024 |
| 2C3Mercaptan | | 0.0001 | (1.1) | (1.1) | 0 | 0.0001 | 0.0001 |
| Water | | 0.0004 | (3.7) | (3.7) | 0 | 0.0004 | 0.0004 |

| Water Streams | Units | Cooling Water 1 | | Cooling Water 2 | | Heating Water | |
|---|---|---|---|---|---|---|---|
| Description | | Inlet | Outlet | Inlet | Outlet | Inlet | Outlet |
| Phase | | L | L | L | L | L | L |
| Flow (total) | GPM | 3700 | 3700 | 880 | 880 | 1700 | 1700 |
| Pressure Drop | psia | 60 | 55 | 60 | 55 | 130 | 125 |
| Temperature | °F. | 113 | 129 | 113 | 235 | 257 | 144 |

What is claimed is:

1. A temperature swing adsorption process for separating a target species from a feed gas mixture containing said target species, which process comprises:
   a) subjecting said feed gas mixture containing said target species to an adsorption step by introducing the feed gas mixture into the feed input end of an adsorbent bed that is comprised of an adsorbent material that is selective for adsorbing said target species, which adsorbent bed having a feed input end and a product output end, and which adsorbent bed is operated at a first pressure and at a first temperature wherein at least a portion of the said target species in the feed gas mixture is adsorbed by the adsorbent bed and wherein a gaseous product stream containing a lower mol % of said target species than said feed gas mixture exits the product output end of said adsorbent bed;
   b) stopping the introduction of said feed gas mixture to said adsorbent bed before breakthrough of said target species from the product output end of said adsorbent bed;
   c) reducing the pressure in said adsorption bed to a second pressure in a manner to induce a flow in the adsorption bed that is counter-current to the flow of the feed gas mixture in step a);
   d) externally heating said adsorbent bed to a second temperature higher than said first temperature while simultaneously passing a flow of purge gas, substantially free of target species, counter-current to the direction of the flow of the feed gas mixture in step a), thereby desorbing and recovering at least a portion of the desorbed target species and resulting in the product outlet end of said adsorbent bed being reduced in the amount of the target species;
   e) cooling at least a portion of said adsorbent bed to a third temperature which is lower than said second temperature used in step d); and
   f) increasing the pressure in said adsorbent bed to a third pressure.

2. The process of claim 1 wherein the first temperature is from −195° C. to 300° C. and the first pressure is from 1 bara to 600 bara.

3. The process of claim 2 wherein the first temperature is from 20° C. to 150° C. and the first pressure is from 2 bara to 200 bara.

4. The process of claim 1 wherein the second temperature is from 10° C. to 300° C.

5. The process of claim 4 wherein the second temperature is from 20° C. to 200° C.

6. The process of claim 1 wherein the third temperature is from −195° C. to 300° C.

7. The process of claim 1 wherein the feed gas mixture is a natural gas stream.

8. The process of claim 7 wherein the target species is selected from the group consisting of $CO_2$, $H_2S$, and a combination thereof.

9. The process of claim 8, wherein the target species comprises $H_2S$, wherein the product outlet end of said adsorbent bed contains no more than 4 vppm $H_2S$, and wherein the feed gas mixture contains between 6 vppm and 10,000 vppm $H_2S$.

10. The process of claim 1 wherein the adsorbent bed has open flow channels throughout its entire length through which the feed gas mixture is passed.

11. The process of claim 10 wherein the adsorbent bed is a parallel channel contactor.

12. The process of claim 1 wherein reduction in pressure of step c) takes place in two or more steps wherein each step reduces the pressure of the adsorbent bed to a lower pressure than the next previous step.

13. The process of claim 1 wherein the external heating of step d) takes place co-current to the direction of gas flow through the adsorbent bed.

14. The process of claim 1 wherein the external heating of step d) takes place counter-current to the direction of gas flow through the adsorbent bed.

15. The process of claim 1 wherein the adsorbent material is an 8-ring zeolite having an Si/Al ratio greater than about 500.

16. The process of claim 15 wherein the 8-ring zeolite is selected from the group consisting of DDR, Sigma-1, ZSM-58, and combinations and intergrowths thereof.

17. The process of claim 1 wherein the heating of step d) is performed in such a way as to cause a thermal wave to travel along the adsorbent bed.

18. The process of claim 17 wherein the thermal wave travels co-current to the direction of gas flow through the adsorbent bed.

19. The process of claim 17 wherein a $T_{90}$ and a $T_{10}$ can be defined with respect to the second temperature and the first temperature such that a temperature differential of $(T_{90}-T_{10})$ occurs over at most 50% of the length of the adsorbent bed.

20. The process of claim 17 wherein the thermal wave exhibits a maximum Peclet number, Pe, less than 10, wherein $Pe=(U*L)/\alpha$, where U represents a heat exchange fluid velocity, L represents a characteristic distance over which heat is transported in a direction roughly perpendicular to fluid flow, and $\alpha$ represents an effective thermal diffusivity of the contactor over the distance L, and wherein U is from about 0.01 m/s to about 100 m/s, and L is less than 0.1 meter.

21. The process of claim 1 wherein less than about 40% of the open pores of the adsorbent bed have diameters greater than about 20 Angstroms and less than about 1 micron.

22. The process of claim 1 wherein the product outlet end of said adsorbent bed is substantially free of the target species.

23. The process of claim 1 wherein said third pressure is between 90% and 100% of the absolute pressure of the feed gas mixture.

* * * * *